(12) United States Patent
McKay et al.

(10) Patent No.: US 6,486,273 B1
(45) Date of Patent: Nov. 26, 2002

(54) MIXED PHOSPHINIMINE CATALYST

(75) Inventors: Ian McKay, Calgary (CA); Alison Ciupa, Chestermere (CA); Barbara Christine Hall, Calgary (CA)

(73) Assignee: Nova Chemicals (International) S.A (CH)

( * ) Notice: Subject to any disclaimer, the term of this patent is extended or adjusted under 35 U.S.C. 154(b) by 30 days.

(21) Appl. No.: 09/835,985

(22) Filed: Apr. 16, 2001

Related U.S. Application Data

(62) Division of application No. 09/616,491, filed on Jul. 14, 2000, now Pat. No. 6,235,672.

(30) Foreign Application Priority Data

Jul. 19, 1999 (CA) .............................................. 2278042

(51) Int. Cl.$^7$ ................................................... C08F 4/06
(52) U.S. Cl. ........................ 526/113; 526/114; 526/118; 526/119; 526/129; 526/160; 526/161; 526/172; 526/348.5; 526/348.6; 502/103; 502/113; 502/155
(58) Field of Search ................................. 526/129, 161, 526/172, 160, 119, 114, 113, 118, 348.5, 348.6, 905; 502/103, 113, 155

(56) References Cited

U.S. PATENT DOCUMENTS

| | | | |
|---|---|---|---|
| 4,530,914 A | 7/1985 | Ewen et al. | 502/113 |
| 4,543,399 A | 9/1985 | Jenkins, III et al. | 526/70 |
| 4,701,432 A | 10/1987 | Welborn, Jr. et al. | 502/113 |
| 4,808,561 A | 2/1989 | Welborn, Jr. | 502/104 |
| 4,935,474 A | 6/1990 | Ewen et al. | 526/114 |
| 4,937,299 A | 6/1990 | Ewen et al. | 526/119 |
| 5,124,418 A | 6/1992 | Welborn, Jr. | 526/114 |
| 5,132,380 A | 7/1992 | Stevens et al. | 526/126 |
| 5,183,867 A | 2/1993 | Welborn, Jr. | 526/114 |
| 5,198,401 A | 3/1993 | Turner et al. | 502/155 |
| 5,352,749 A | 10/1994 | DeChellis et al. | 526/68 |
| 5,648,310 A | 7/1997 | Wasserman et al. | 502/120 |
| 5,672,669 A | 9/1997 | Wasserman et al. | 526/170 |
| 5,674,795 A | 10/1997 | Wasserman et al. | 502/9 |
| 6,063,879 A * | 5/2000 | Stephan et al. | 526/127 |

* cited by examiner

Primary Examiner—David W. Wu
Assistant Examiner—William K Cheung
(74) Attorney, Agent, or Firm—Kenneth H. Johnson

(57) ABSTRACT

A supported catalyst for the polymerization of olefins, especially ethylene, has at least two catalyst components having different propagation and/or termination constants. Each catalyst component must have at least one phosphinimine ligand. The polymer produced according to this invention has a broad molecular weight distribution. Catalysts according to this invention have a very surprising and desirable hydrogen response.

10 Claims, No Drawings

MIXED PHOSPHINIMINE CATALYST

This is a division, of application Ser. No. 09/616,491, filed Jul. 14, 2000 now U.S. Pat. No. 6,235,672 issued on May 22, 2001.

FIELD OF THE INVENTION

This invention relates to catalysts for the preparation of polyethylene having a broad molecular weight distribution.

BACKGROUND OF THE INVENTION

It is well known that linear polyethylene may be prepared by the polymerization of ethylene (optionally with one or more olefins or diolefins such as butene, hexene, octene or hexadiene) using a "Ziegler" catalyst system which comprises a transition metal compound (such as a titanium halide or a vanadium halide and an aluminum alkyl). Polyethylene produced in this manner, particularly "linear low density polyethylene", is in widespread commercial use. However, the conventional linear low density polyethylene ("lldpe") made with Ziegler catalysts suffers from a number of deficiencies. Most notably, conventional lldpe is a heterogeneous product which contains a small fraction of low molecular weight wax and a comparatively large amount of very high molecular weight homopolymer. The heterogeneous nature of these polymers generally detracts from the physical properties made from them.

Accordingly, a great deal of effort has been directed towards the preparation of "homogeneous" lldpe resins which mitigate this problem. In particular, it is now well known to those skilled in the art that so-called "metallocene" catalysts may be used to produce homogeneous lldpe resin. These homogeneous resins are, however, not without problems. Most notably, these homogeneous resins typically have a narrow molecular weight distribution and are difficult to "process" or convert into finished polyethylene products. Thus, efforts to improve the processability of homogeneous polyethylene resin by broadening the molecular weight distribution have been made and are disclosed, for example in U.S. Pat. Nos. 4,530,914; 4,701,432; 4,935,474; 4,937,299; 5,124,418 and 5,183,867.

In copending and commonly assigned patent applications there are disclosed certain phosphinimine catalysts which may be used to produce homogeneous polyethylene.

SUMMARY OF THE INVENTION

The present invention provides a catalyst system for the (co)polymerization of ethylene to polyethylene having a broad molecular weight distribution, said catalyst system comprising:

a) at least two different mono or di-phosphinimine catalysts;
b) at least one cocatalyst; and
c) a particulate support.

It will be understood by those skilled in the art that said two different mono or di-phosphinimine catalysts must have different propagation and/or termination constants in order to produce a polymer having a broad molecular weight distribution.

As used herein, the term "mono-phosphinimine catalyst" refers to a catalyst having a single phosphinimine ligand and "di-phosphinimine catalyst" refers to a catalyst having two phosphinimine ligands.

It is required that at least two different catalysts be employed. The differences may be achieved, for example, by the use of different transition metals, different cyclopentadienyl ligands, different phosphinimine ligands or combinations thereof.

DETAILED DESCRIPTION

It is preferred that each of at least two phosphinimine catalysts used in this invention is defined by the formula:

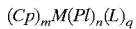

wherein Pl is a phosphinimine ligand (see section 1.1 below); Cp is a cyclopentadienyl-type ligand (section 1.2 below); L is a monoanionic activatable ligand (section 1.3 below); m is a metal selected from Ti, Hf and Zr; and wherein m is 0 or 1; n is 1 or 2; and m+n+q=the valence of the metal m.

The two phosphinimine catalysts must be different as further described in the Examples.

The most preferred catalysts are those in which the metal is 4 valent. For example, a catalyst may be a cyclopentadienyl (phosphinimine) complex of titanium, zirconium, or hafnium having two additional, monoanionic ligands. It is particularly preferred that each catalyst contains one phosphinimine ligand, one cyclopentadienyl ligand and two chloride or alkyl ligands.

1.1 Phosphinimine Ligand

Each catalyst must contain at least one phosphinimine ligand which is covalently bonded to the metal. Phosphinimine ligands are defined by the formula:

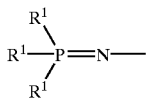

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

1.2 Cyclopentadienyl Ligands

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently selected from the group consisting of hydrogen, a $C_{1-8}$ alkyl or alkoxy radical $C_{6-10}$ aryl or aryloxy radicals; germanyl radicals of the formula Ge—(R)$_3$ wherein R is as defined directly above.

1.3 Activatable Ligand

The term "activatable ligand" refers to a ligand which may be activated by a cocatalyst, (or "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred first catalyst metals are group 4 metals in their highest oxidation state (i.e. 4$^+$) and the preferred activatable ligands are monoanionic (such as a halide—especially chloride or an alkyl—especially methyl). Thus, the preferred first catalyst contains a phosphinimine ligand, a cyclopentadienyl ligand and two chloride (or methyl) ligands bonded to the group 4 metal. In some instances, the metal of the first catalyst component may not be in the highest oxidation state. For example, a titanium (III) component would contain only one activatable ligand. Also, it is permitted to use a dianionic activatable ligand although this is not preferred.

2. Description of Cocatalyst

The catalyst components described in part 1 above are used in combination with at least one cocatalyst (or "activator") to form an active catalyst system for olefin polymerization as described in more detail in sections 2.1 and 2.2 below.

2.1 Alumoxanes

The alumoxane may be of the formula:

$(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

2.2 "Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably because the non-coordinating anion is sufficiently labile to be displaced by monomer which coordinates to the catalyst). Preferred ionic activators are boron-containing ionic activators described in (i)—(iii) below:

(i) compounds of the formula $[R^5]^+[B(R^7)_4]^-$ wherein B is a boron atom, $R^5$ is an aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—(R$^9$)$_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropilliur tetrakispentafluorophenyl borate,
triphenylmethylium tetrakispentafluorophenyl borate,
benzene(diazonium)tetrakispentafluorophenyl borate,
tropillium phenyltrispentafluorophenyl borate,
triphenylmethylium phenyltrispentafluorophenyl borate, benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl) borate,
benzene(diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl) borate, and
benzene(diazonium)tetrakis(2,3,4,5-tetrafluorophenyl) borate.

Readily commercially available ionic activators include: N,N-dimethylaniliniumtetrakispentafluorophenyl borate, triphenylmethylium tetrakispentafluorophenyl borate, and trispentafluorophenyl borane.

Heterogeneous Catalysts

The catalysts of this invention are used in a particulate or heterogeneous form. It is also highly preferred that the catalyst does not cause reactor fouling. The art of preparing heterogeneous catalysts which do not lead to reactor fouling is not adequately understood, though it is generally accepted that the catalytic material should be very well anchored to the support so as to reduce the incidence of fouling resulting from the deposition of catalyst or cocatalyst which has dissociated from the support.

In general, heterogeneous catalysts may be grouped into three main categories:

3.1. "Unsupported" Alumoxane/Catalyst Mixtures

These catalysts may be easily prepared by evaporating the solvent or diluent from a liquid mixture of an alumoxane and the two catalyst components. The resulting product is a solid at room temperature due to the comparatively high molecular weight of the alumoxane. Thus, the alumoxane forms the support. This may be done "in-situ" (i.e. in the reactor) by spraying the alumoxane and catalysts into the reactor.

There are two disadvantages to using alumoxane as the support. The first is cost: alumoxanes are comparatively expensive—and the alumoxane is used as an expensive "support" material). The second is "reaction continuity/fouling" (i.e. the alumoxane may partially melt under polymerization conditions, leading to reactor instability/fouling).

3.2. Conventional Supported Catalysts

Supported catalysts are conventionally prepared by depositing the catalyst components and a cocatalyst on a very porous metal oxide support such as silica or alumina. The catalyst and cocatalyst are substantially contained within the pore structure of the metal oxide particle. This means that a comparatively large metal oxide particle is used (typically particle size of from 40 to 80 microns). The preparation of this type of supported catalyst is described in U.S. Pat. No. 4,808,561 (Welborn, to Exxon).

Metal oxides, especially silica or alumina, are preferred support materials. Other supports known to those skilled in the art include polymers (such as polyolefins or polystyrene-co-divinyl benzene), zeolites and ceramics.

3.3. Filled/Spray Dried Catalysts

This method of catalyst preparation is also well known. For example, U.S. Pat. Nos. 5,648,310; 5,674,795 and 5,672,669 (all to Union Carbide) teach the preparation of a heterogeneous catalyst by spray drying a mixture which contains a metallocene catalyst, an alumoxane cocatalyst and a "filler" which is characterized by having a very small particle size (less than one micron) and by being unreactive with the catalyst and cocatalyst. The examples illustrate the use of very fine particle size "fumed" silica which has been treated to reduce the concentration of surface hydroxyls. The resulting catalysts exhibit good productivity. Moreover, they offer the potential to provide a catalyst which is not prone to "hot spots" (as the catalyst may be evenly distributed, at low concentration, throughout the heterogeneous matrix). However, these catalysts suffer from the potential disadvantage of being very friable because they are prepared with a fine, "inert" filler material which does not react with/anchor to the catalyst or cocatalyst.

Friable catalyst particles lead to the formation of "fines" in the polyethylene product, and may also aggravate reactor fouling problems.

An alternative approach is the preparation of spray dried catalysts using a hydrotalcite as a "reactive" filler (as opposed to the unreactive filler described in the above mentioned U.S. Pat. No. to Union Carbide). This method of catalyst preparation is described in more detail in a commonly assigned patent application. Either approach is suitable for use with the catalysts of this invention.

4. Polymerization Processes

The catalysts of this invention are suitable for use in any conventional olefin polymerization process, such as the so-called "gas phase", "slurry", "high pressure" or "solution" polymerization processes.

The polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1 -butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so-called very low and ultra low density polyethylenes.

The catalyst of this invention is preferably used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid preferably does not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the process of this invention.

EXAMPLES

The invention will now be illustrated in further detail by way of the following non-limiting examples. For clarity, the Examples have been divided into two parts, namely Part A (Catalyst Component Synthesis) and Part B (Gas Phase Polymerization).

Polymer Analysis

Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight (Mn) and weight average molecular weight (Mw), respectively. Melt index (Ml) measurements were conducted according to ASTM method D-1238-82.

Polymer densities were measured using pressed plaques (ASTM method D-1928-90), with a densitometer.

The following abbreviations have the following meanings:

tBu = tertiary butyl (e.g. $^tBU_3$ = tri-tertiary butyl)
Me = methyl
Cp = pentamethylcyclopentadienyl
Mw = weight average molecular weight
Mn = number average molecular weight
MWD = molecular weight distribution (or Mw/Mn)
PE = polyethylene
Cat = catalyst
Hr = hour
M = molar Part A—Catalyst Synthesis Catalysts A to F Comparative and inventive supported catalysts were prepared according to the following procedure. Minimal amounts of toluene were used for preparation of slurries and/or solutions.

The support material, silica (Grace-Davison, Sylopol 955), was dehydrated for 2 hours at 200° C. under an air atmosphere in a fluidized bed apparatus, followed by an additional period of 6 hours at 600° C. under a nitrogen atmosphere. Unless otherwise specified, the solvent used for synthesis was dry, degassed toluene. A specified amount of dehydrated silica was slurried in toluene to which was added a sufficient amount of methylaluminoxane ("MAO") solution to achieve a 12% aluminum by weight loading in the dried supported MAO/silica product. The solution was stirred for 16 hours at room temperature and then the solvent was removed under vacuum to yield the supported methylaluminoxane.

Silica supported methylaluminoxane was slurried in toluene. An amount of organometallic complex sufficient to allow for an Al:Ti molar ratio of approximately 120:1 was separately dissolved in toluene and added to the slurried MAO/silica support material. The combined mixture was stirred for 2 hours at room temperature and an additional 2 hours at 45° C. Catalyst solids were recovered by filtration and typically washed up to 3 times with small amounts of toluene and additionally up to twice with small amounts of hexane prior to drying under vacuum.

The specific amounts of materials used in catalyst preparations of supported organometallic and mixed organometallic catalyst systems are presented in Table 1.

TABLE 1

| Catalyst Name | Silica-Supported MAO (g)[a] | Complex 1 (g)[b] | Complex 2 (g)[c] | Complex 3 (g)[d] | Complex 4 (g)[e] |
|---|---|---|---|---|---|
| A | 122.17 | 2.75 | | | |
| B | 5.01 | | | 0.203 | |
| C | 5.00 | 0.042 | 0.037 | | |
| D | 5.00 | 0.042 | | 0.034 | |
| E | 5.00 | 0.042 | | | 0.035 |

[a]For catalyst A, the Al concentration in the silica-supported MAO was 16.2 wt %. For catalyst B, the Al concentration in the silica-supported MAO was 22.5 wt %. For catalysts C and D, the Al concentration in the silica-supported MAO was 12 wt %.
[b]Complex 1 is indenyl tri-tertiarybutylphosphinimidyl titanium dichloride, $(Ind)(tBu_3P=N)TiCl_2$.
[c]Complex 2 is cyclopentadienyl tri-tertiarybutylphosphinimidyl titanium dichloride, $(Cp)(tBu_3P=N)TiCl_2$.
[d]Complex 3 is bis(n-butylcyclopentadienyl) zirconium dichloride, $(nBuCp)_2ZrCl_2$.
[e]Complex 4 is dimethylsilane(2,3,4,5-tetramethylcyclopentadienyl)(tertiary-butylamido) titanium dichloride $(Cp*Si(CH_3)_2tBuN)TiCl_2$.

Catalysts A and B
Catalyst G

Dehydrated silica (200 g) was introduced to a reaction vessel and pentane (1.5 L) was added. With stirring, triethylaluminum (12.2 g in pentane) was added over 10 minutes at room temperature. After stirring the slurry for 15 minutes at room temperature, the solvent was removed at 70° C. with a nitrogen ($N_2$) purge. To a slurry of this prepared support (60 g) in pentane (300 mL) at room temperature was added dibutyl magnesium ($Bu_2Mg$) (9.6 g, in hexane) over 10 minutes followed by the addition of triethylaluminum (0.98 g, in hexane). After the addition was complete, the reaction mixture was stirred for 2 hours. The slurry was then heated to 50° C. to remove most of the solvent followed by $N_2$ flushing to obtain an essentially dry catalyst precursor. This procedure was repeated sequentially for the addition of tertiary-butyl chloride (12.9 g in pentane) and $TiCl_4$ (1.66 g in pentane) except the drying temperature was lowered to 40° C.

Catalyst H

This mixed catalyst system was prepared using Catalyst G as a starting material in the following procedure. 5.00 g of Catalyst G was slurried in toluene under an inert atmosphere. 2.314 g of a 13.5 weight % Al solution of MAO was added and the mixture was stirred for 16 hours at room temperature. Solvent was then removed under vacuum and the product was sieved through a 250 micron mesh screen.

5.00 g of the product of the reaction above was slurried in toluene. 0.234 g of indenyl tri-tertiarybutylphosphinimidyl titanium dichloride, $(Ind)(tBu_3P=N)TiCl_2$, was dissolved in toluene and added to the slurried support. This mixture was stirred for 2 hours at room temperature and an additional 2 hours at 45° C. Solvent was removed by filtration and the product was washed 3 times with toluene and then 2 times with hexane. Residual solvent was then removed under vacuum.

Part B—Polymerization

All polymerization work was performed using a 2 L, stirred, autoclave reactor running in a gas phase mode of operation. Polymerizations were conducted at 90° C. under a total reaction pressure of 200 psig. A seed bed was not used. However, a specified amount of a 25 wt % solution of tri-isobutylaluminum (TiBAL) was used as an impurity scavenger. 5 mL of 1-hexene was injected into each polymerization as comonomer. After addition of scavenger and comonomer, ethylene was used to push the catalyst into the reactor and to bring the reactor pressure up to the total operating pressure of 200 psig.

Polymerization details are given in Table 2.

Entries 1 to 4 of Tables 2 and 3 describe comparative experiments which were completed using conventional "single site" catalysts.

As might be expected, the polymers made with these catalysts have a comparatively narrow molecular weight distribution (calculated by Mw/Mn) and the addition of hydrogen during the polymerization does not significantly effect this result. Comparative experiments 13 and 14 illustrate the use of a Ziegler Natta catalyst which provides a polyethylene having a conventional (broad) molecular weight distribution.

Experiments 15 and 16 show that the combination of a Ziegler Natta catalyst and a phosphinimine catalyst provides a broad MWD. Entries 7, 8, 9 and 10 illustrate that a mixture of a phosphinimine catalyst with a second single site catalyst (namely zirconocene for experiments 7/8 and a so-called "constrained geometry" catalyst for experiments 9/10) does produce a desirable broadening of the molecular weight distribution.

Inventive experiments 5 and 6 illustrate two surprising and desirable results. Firstly, the MWD of the polymer produced in inventive experiment 5 is substantially broader than the MWD of polymers produced with comparative "mixed catalysts". Secondly, the addition of hydrogen has an extremely large effect on the MWD. More specifically, the addition of hydrogen to the polymerization reaction of experiment 6 reduced the molecular weight distribution to 2.99 (from 9.28 in experiment 5). This large "hydrogen response" is very unusual and provides an important process control capability.

TABLE 2

Polymerization Data

| Example | Catalyst | Catalyst Wt. (mg) | $H_2$ (psi) | Reaction Time (min.) | Yield PE (g) | Activity[a] | Productivity[b] |
|---|---|---|---|---|---|---|---|
| 1[c] | A | 9 | 0 | 34 | 41.35 | 342194 | 4596 |
| 2[c] | A | 25 | 0.35 | 33.3 | 28.02 | 77602 | 1120 |
| 3[c] | B | 33 | 0 | 125 | 43.2 | 13120 | 1309 |
| 4[c] | B | 63 | 0.35 | 173 | 47.23 | 5423 | 749 |
| 5 | C | 26 | 0 | 60 | 36.87 | 80976 | 1417 |
| 6 | C | 41 | 0.35 | 60 | 19.83 | 27581 | 483 |
| 7[c] | D | 40 | 0 | 60 | 43.11 | 83098 | 1077 |
| 8[c] | D | 51 | 0.35 | 60 | 27.05 | 40853 | 529 |

TABLE 2-continued

Polymerization Data

| Example | Catalyst | Catalyst Wt. (mg) | $H_2$ (psi) | Reaction Time (min.) | Yield PE (g) | Activity[a] | Productivity[b] |
|---|---|---|---|---|---|---|---|
| 9[c] | E | 77 | 0 | 60 | 25.45 | 18617 | 330 |
| 10[c] | E | 114 | 0.35 | 60 | 10.03 | 4914 | 87 |
| 11[c] | G | 35 | 0 | 60 | 67.43 | 35659 | 1926 |
| 12[c] | G | 37 | 0.35 | 60 | 89.87 | 44961 | 2428 |
| 13[c] | H | 29 | 0 | 60 | 84.13 | 31284 | 2900 |
| 14[c] | H | 42 | 0.35 | 60 | 46.59 | 11956 | 1108 |

[a]Activity is given in units of grams of polyethylene (gPE)/mmol metal-molar ethylene-hour.
[b]Productivity is given in units of grams of polyethylene/gram of supported catalyst
[c]Comparative Molecular weights for the polymer products obtained from the polymerization examples were determined by size exclusion chromatography. The collected results are presented numerically in Table 3.

TABLE 3

| Example | Mn (×10⁻³) | Mw (×10⁻³) | Mz (×10⁻³) | Mw/Mn |
|---|---|---|---|---|
| 1 | 161.8 | 363.4 | 660.9 | 2.25 |
| 2 | 35.7 | 89.0 | 159.1 | 2.49 |
| 3 | 28.6 | 70.4 | 129.9 | 2.46 |
| 4 | 14.0 | 36.7 | 67.2 | 2.62 |
| 5 | 28.2 | 261.8 | 556.9 | 9.28 |
| 6 | 21.5 | 64.3 | 108.5 | 2.99 |
| 7 | 66.0 | 177.9 | 353.8 | 2.70 |
| 8 | 24.8 | 59.0 | 100.0 | 2.38 |
| 9 | 63.6 | 170.7 | 399.0 | 2.68 |
| 10 | 25.3 | 55.0 | 90.5 | 2.17 |
| 11 | 63.4 | 422.5 | 1311.0 | 6.66 |
| 12 | 63.5 | 408.7 | 1267.0 | 6.44 |
| 13 | 57.8 | 421.1 | 964.5 | 7.28 |
| 14 | 33.7 | 326.9 | 1213.0 | 9.7 |

What is claimed is:

1. A process for the (co)polymerization of ethylene to elastomeric polyethylene having a broad molecular weight distribution comprising polymerizing ethylene in the presence of a catalyst system comprising:
  a) at least two different mono or di-phosphinimine catalysts;
  b) at least one cocatalyst; and
  c) a particulate support.

2. The process of claim 1 wherein each of said phosphinimine catalysts is an organometallic complex of a group 4 metal and wherein said catalysts and said at least one cocatalyst are supported on silica.

3. The process of claim 2 wherein said at least one cocatalyst comprises alumoxane and wherein said group 4 metal is titanium.

4. The process of claim 2 wherein each of said phosphinimine catalysts is described by the formula:

$$(Cp)_m M(Pl)_n L_q$$

wherein a) Cp is a ligand selected from the group consisting of cyclopentadienyl, substituted cyclopentadienyl, indenyl, substituted indenyl, fluorenyl and substituted fluorenyl; b) M is a group 4 metal selected from titanium, zirconium and hafnium; c) Pl is a phosphinimine ligand; d) L represents an activatable ligand; e) m=0 or 1; n=1 or 2; q is 1 or 2; and f) m+n+q=the valence of said metal M.

5. The process of claim 4 wherein said at least two phosphinimine catalysts consist of a first catalyst and a second catalyst and wherein:
  a) said first catalyst is characterized by the requirements that m=1 and Cp is selected from the group consisting of cyclopentadienyl and substituted cyclopentadienyl; and
  b) said second catalyst is characterized by the requirements that m=1 and Cp is selected from the group consisting of indenyl and substituted indenyl.

6. The process of claim 4 wherein said phosphinimine ligand Pl is defined by the formula:

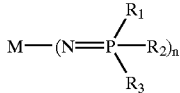

wherein each of $R_1$, $R_2$ and $R_3$ is a hydrocarbyl group having from 1 to 10 carbons and wherein M and n are as defined in claim 4.

7. The process according to claim 6 wherein said at least two phosphinimine catalysts comprises a first catalyst and a second catalyst and wherein said first catalyst is characterized by the requirements that n=2 and l=0 and said second catalyst is characterized by the requirement that n=1 and l=1.

8. The process according to claim 6 wherein said at least two phosphinimine catalysts comprises a first catalyst and a second catalyst and wherein m is 1 and n is one for each of said first catalyst and said second catalyst with the provision that said $R_1$, $R_2$ and $R_3$ of said first catalyst are different hydrocarbyl groups compared to said $R_1$, $R_2$ and $R_3$ of said second catalyst.

9. The process of claim 2 wherein said (co)polymerization is the polymerization of ethylene and at least one additional alpha olefin selected from butene, hexene or octene and wherein said (co)polymerization is undertaken in the presence of hydrogen.

10. The process according to claim 5 wherein said (co)polymerization is the polymerization of ethylene and at least one additional alpha olefin selected from butene, hexene and octene and wherein said (co)polymerization is undertaken in the presence of hydrogen.

* * * * *